(12) United States Patent
Mikesell et al.

(10) Patent No.: US 9,109,929 B2
(45) Date of Patent: Aug. 18, 2015

(54) FLUID FLOW MONITORING SYSTEM

(71) Applicant: Waterman Industries, Inc., Exeter, CA (US)

(72) Inventors: Kenneth W. Mikesell, Arvada, CO (US); Darryl R. Pauls, Visalia, CA (US)

(73) Assignee: Waterman Industries, LLC, Exeter, CA (US)

( * ) Notice: Subject to any disclaimer, the term of this patent is extended or adjusted under 35 U.S.C. 154(b) by 150 days.

(21) Appl. No.: 13/952,488

(22) Filed: Jul. 26, 2013

(65) Prior Publication Data

US 2014/0026677 A1    Jan. 30, 2014

Related U.S. Application Data

(60) Provisional application No. 61/676,430, filed on Jul. 27, 2012.

(51) Int. Cl.
*G01F 1/00* (2006.01)
*G01F 15/00* (2006.01)
*G01F 15/06* (2006.01)

(52) U.S. Cl.
CPC *G01F 1/00* (2013.01); *G01F 15/00* (2013.01); *G01F 15/068* (2013.01)

(58) Field of Classification Search
CPC ............... G01F 1/66; G01F 1/44; G01F 1/00; G01F 7/00; G01M 3/04
USPC ..................... 73/861, 861.28, 861.27, 861.25, 73/861.64, 49.7, 197
See application file for complete search history.

(56) References Cited

U.S. PATENT DOCUMENTS

| 4,164,144 | A | * | 8/1979 | Kaiser et al. | 73/861.64 |
| 5,069,062 | A | * | 12/1991 | Malecek et al. | 73/49.7 |
| 5,085,076 | A | * | 2/1992 | Engelmann | 73/197 |
| 5,192,051 | A | * | 3/1993 | Roberson | 251/328 |
| 6,981,513 | B2 | * | 1/2006 | Krywitsky | 137/68.14 |

OTHER PUBLICATIONS

U.S. Appl. No. 61/676,430, filed Jul. 27, 2012.

* cited by examiner

*Primary Examiner* — Jewel V Thompson
(74) *Attorney, Agent, or Firm* — Craig R. Miles; CR Miles P.C.

(57) ABSTRACT

A fluid flow conditioning conduit for a fluid flow control gate which generates a conditioned fluid flow coupled to a flow meter which measures the velocity of the conditioned fluid flow allowing calculation of the volume of the conditioned fluid flow.

22 Claims, 9 Drawing Sheets

FLUID FLOW MONITORING SYSTEM

This United States Non-Provisional Patent Application claims the benefit of U.S. Provisional Patent Application No. 61/676,430, filed Jul. 27, 2012, hereby incorporated by reference herein.

I. BACKGROUND

A fluid flow conditioning conduit for a fluid flow control gate which generates a conditioned fluid flow coupled to a flow meter which measures velocity of the conditioned fluid flow allowing calculation of a volume of the conditioned fluid flow based on the configuration of the fluid flow conditioning conduit.

Fluid flow control gates are employed to control fluid flow through a passageway or channel. Conventional slide gates, as an example, provide a frame assembly which defines an opening through which fluid flows, a gate slidely mounted to the frame assembly, and a gate operating means for generating movement in the gate between an open position and a closed position for regulating fluid flow through the opening.

The frame assembly can be mounted to walls which define a passageway or channel through which the fluid flows such that substantially all of the fluid flows through the opening in the frame assembly. In this way, fluid flow through the opening of the gate can be regulated by the position of the gate within the frame assembly.

Many states have enacted laws which require agricultural water suppliers to measure the volume of water delivered to customers. As an example, in California, Senate Bill x7-7 enacted in November 2009, requires all water suppliers to increase water use efficiency by preparing and adopting agricultural water management plans which in part require the water supplier to measure the volume of water delivered to customers and adopt a pricing structure for water customers based at least in part on quantity delivered. Agricultural water suppliers who do not meet the water management planning requirements established by the law may be not eligible for state water grants or loans.

A substantial problem for water suppliers in measuring the volume of water delivered to customers may be that the structure of conventional slide gates produces a fluid flow having fluid flow characteristics which can vary to an extent that the volume of water passing through the fluid flow control gate may not be effectively or efficiently measured.

II. SUMMARY OF THE INVENTION

Accordingly, a broad object of the invention can be to provide a fluid flow conditioning conduit for a fluid flow control gate having one or more structural elements which act on fluid flow delivered from the fluid flow control gate to provide a conditioned fluid flow having sufficiently uniform fluid flow characteristics over a wide range of fluid flow control gate operating conditions to make measurement of the volume of fluid flowing from the fluid flow control gate more efficient or effective.

Another object of the invention can be to provide a method of making a fluid flow conditioning conduit whether for retrofitting an existing fluid flow control gate, or as an assembly including a fluid flow control gate, or as a one piece fluid flow control gate and fluid flow conditioning conduit which includes one or more structural elements which act on fluid flow delivered from the fluid flow control gate to provide a conditioned fluid flow having sufficiently uniform fluid flow characteristics over a wide range of fluid flow control gate operating conditions to make measurement of the volume of fluid flowing from the fluid flow control gate more efficient or effective.

Another substantial object of the invention can be to provide a method of generating a conditioned fluid flow for measurement of the volume of a fluid flowing from a fluid flow control gate which includes one or more of: generating a fluid flow between a first end and a second end of a fluid flow conditioning conduit having a substantially uniform internal configuration; adjusting the level of the fluid flow to substantially fill the fluid flow conditioning conduit between the first end and the second end; directing the fluid flow toward the central longitudinal axis of the fluid flow conditioning conduit; generating increased laminar flow between the first end and the second end of a fluid flow conditioning conduit; generating increased homogeneity of fluid flow velocity over the cross sectional area of the fluid flow path; and flushing the fluid flow delivery conduit of accumulated debris.

Naturally, further objects of the invention are disclosed throughout other areas of the specification, drawings, photographs, and claims.

IV. DETAILED DESCRIPTION OF THE PREFERRED EMBODIMENTS

A fluid flow conditioning conduit for a fluid flow control gate which generates a conditioned fluid flow coupled to a flow meter which measures the velocity of the conditioned fluid flow allowing calculation of the volume of the conditioned fluid flow.

Figure 6:
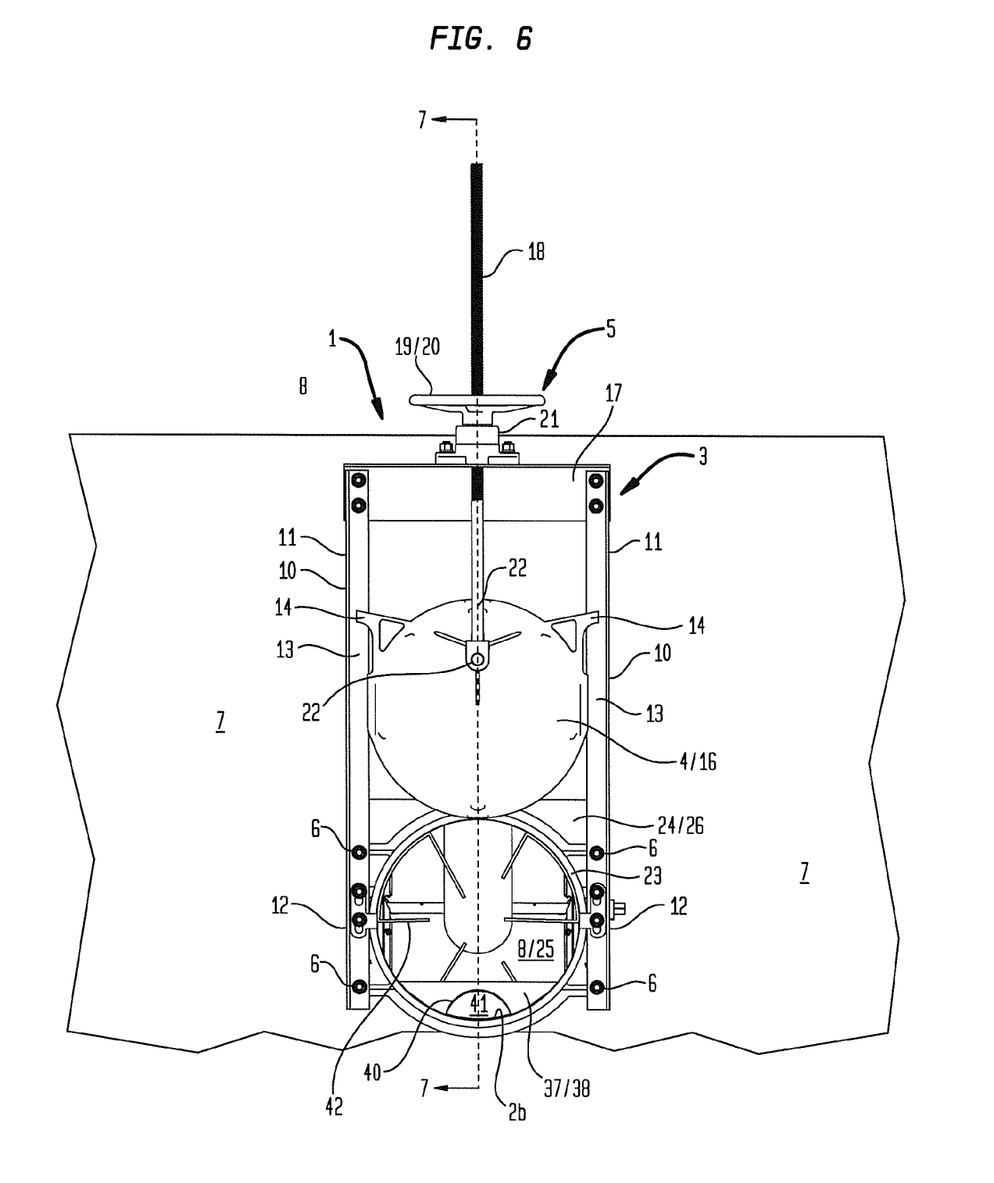
FIG. 6 is first end view of a particular embodiment of a fluid flow delivery conduit coupled to a fluid flow control gate in the open condition.

Now generally referring to FIGS. 1 through 7, which show a particular embodiment of a fluid flow control gate (1) coupled to a particular embodiment of a fluid flow conditioning conduit (2). Typically, the fluid flow control gate (1) includes a frame assembly (3), a gate (4), and a gate operator (5). The frame assembly (3) can include a mount element (6) adapted to anchor the frame assembly (3) to fluid retaining walls (7) which define a fluid passageway (8) or channel through which a fluid (9) flows such that substantially all of the fluid (9) flows through the opening in the frame assembly (3) (as shown in the example of FIG. 6). For the purposes of this invention the term "fluid" means any liquid flowable through a fluid flow conditioning conduit (2) and without limitation to the breadth of the forgoing can be water.

Figure 1:
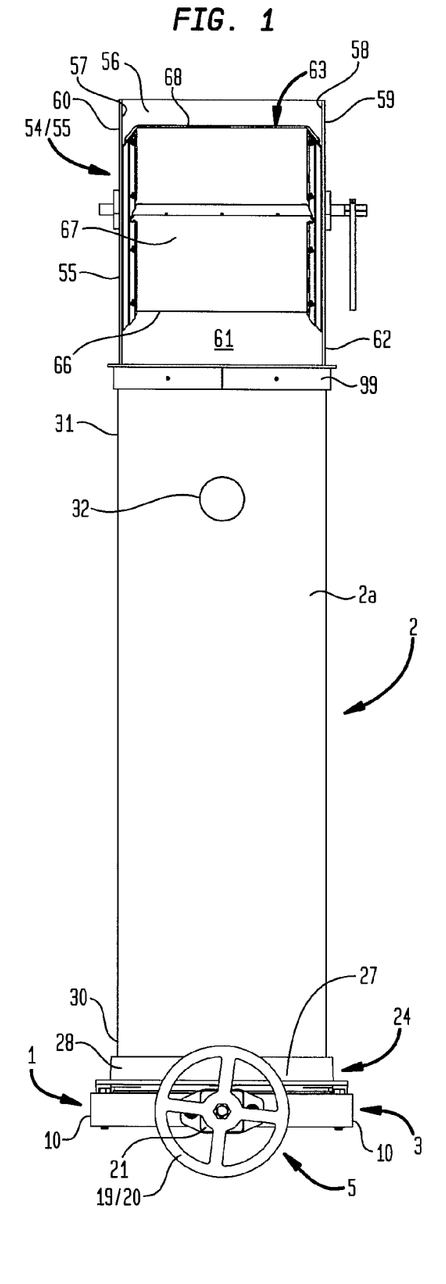
FIG. 1 is top view of a particular embodiment of a fluid flow delivery conduit coupled to a fluid flow control gate.
Figure 2:
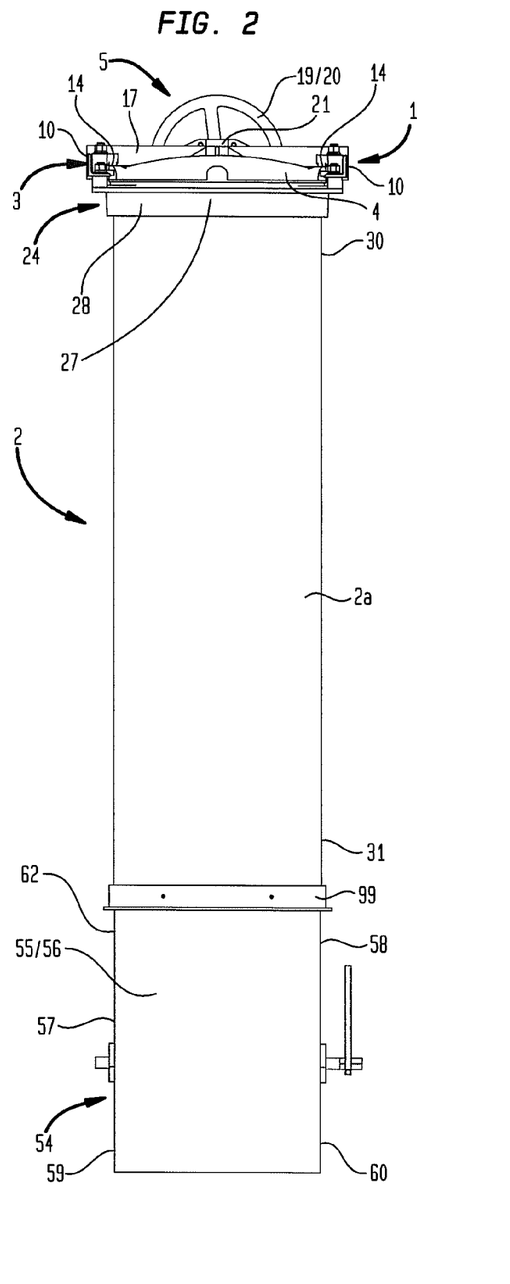
FIG. 2 is bottom view of a particular embodiment of a fluid flow delivery conduit coupled to a fluid flow control gate.
Figure 3:
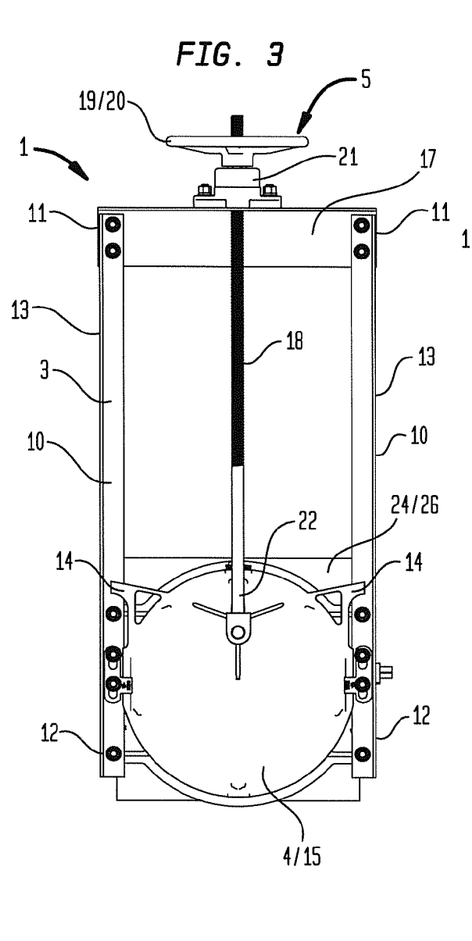
FIG. 3 is first end view of a particular embodiment of a fluid flow delivery conduit coupled to a fluid flow control gate in the closed condition.
Figure 4:
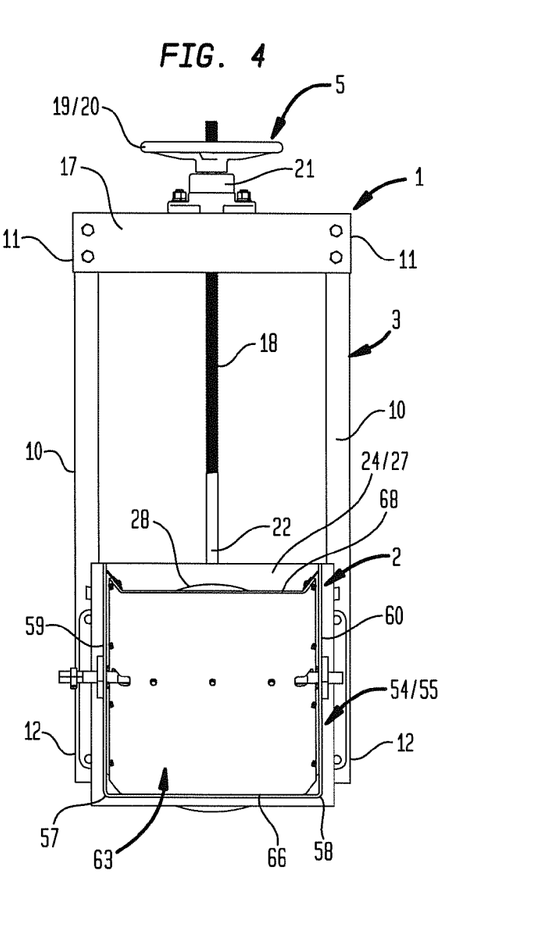
FIG. 4 is second end view of a particular embodiment of a fluid flow delivery conduit coupled to a fluid flow control gate.
Figure 5:
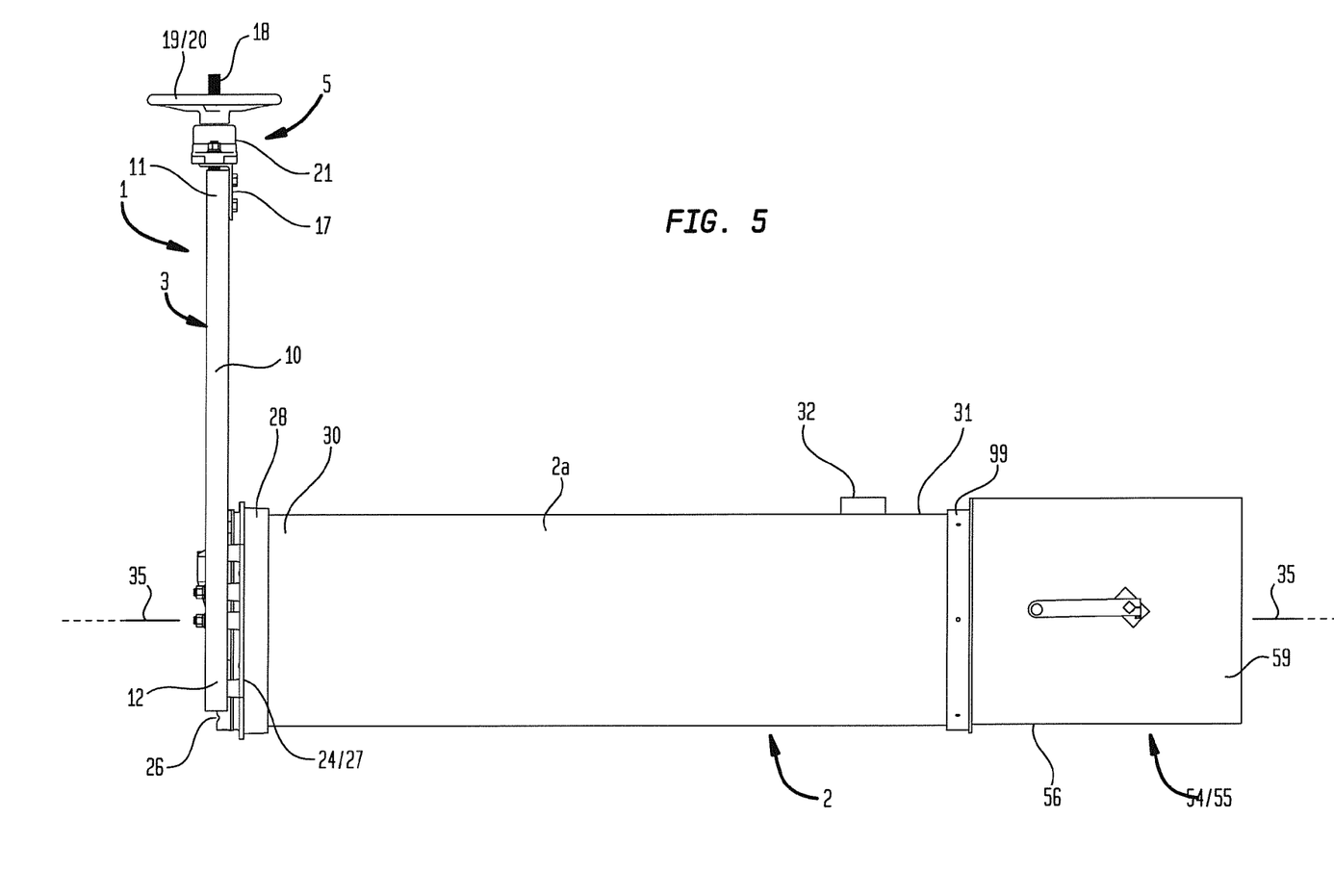
FIG. 5 is a side view of a particular embodiment of a fluid flow delivery conduit coupled to a fluid flow control gate.

Now referring primarily to FIGS. 3 and 4, the frame assembly (3) can include a pair of gate guide members (10) disposed in substantially parallel relation a distance apart each having a length between a guide first end (11) and a guide second end (12) (as shown in the example of FIG. 3). The pair of gate guide members (10) can correspondingly provide a pair of guide elements (13) to which the gate (4) slidably mates allowing the gate (4) to travel in sliding relation to the pair of gate guide members (10). As shown, the gate (4) can include a pair of channel elements (14) each of which receive within a corresponding one of the pair guide elements (13); however, the invention is not so limited, and the gate (4) can be coupled in relation to the frame assembly in any manner which allows the gate (4) to travel between the closed condition (15) of the fluid flow control gate (1) (as shown in the example of FIG. 3) and the open condition (16) of the fluid flow control gate (1) (as shown in the example of FIG. 6).

Now referring primarily to FIG. 6, a top frame member (17) can be coupled between the guide first ends (11) of the pair of gate guide members (10). The top frame member (17) can in part support the gate operator (5) which operates to move the gate (4) relative to frame assembly (3). Embodiments of the gate operator (5) can for example include a threaded stem (18) extending through the top frame member (17). A hand wheel (19) which provides a threaded member (20) can be journaled for rotation in a housing (21) mounted to the top frame member (17). The threaded member (20) can receive the threaded stem (18) secured at a stem lower end (22) to the gate (4). By rotation of the hand wheel (19), which correspondingly rotates the threaded member (20) in relation to the threaded stem (18) in a first direction, the gate (4) can be raised to disengage the gate (4) whether in part or in whole from a sealing face (23) of a fluid flow conditioning conduit interface (24) (also referred to as a "conduit interface") supported between the pair of gate guide members (10) allowing the fluid (9) to flow through an conduit interface opening (25). By rotation of the hand wheel (19) in a second direction, the gate (4) can be lowered to any selected height to in part or in whole engage the sealing face (23) of the conduit interface (24). While the embodiment of the gate operator (5) shown in the Figures is in the form of a rising stem gate; the invention is not so limited, and embodiments of the gate operator (5) can take the form of a non-rising stem gate or other constructional form which can operate to move the gate (4) between the closed condition (15) and the open condition (16).

Now referring primarily to FIG. 6, particular embodiments of the conduit interface (24) can include a generally circular sealing face (23) which defines a generally circular conduit interface opening (25) which communicates between a conduit interface first side (26) and a conduit interface second side (27) of the conduit interface (24); however, other embodiments of the invention can include a conduit interface opening (25) which defines an opening configured as a square, a rectangle, an oval, or other configuration depending on the application.

Again generally referring to FIGS. 1-7, a fluid flow conditioning conduit (2) can be joined to the conduit interface second side (27) to provide a conduit fluid flow path (29) for the fluid (9) flowing through the conduit interface opening (25) (as shown in the example of FIG. 6). While the embodiments shown in the Figures show a fluid flow conditioning conduit (2) having a substantially cylindrical external surface (2a), other embodiments of the fluid flow conditioning conduit (2) can be in the form of a tubular member having an external surface (2a) which in cross section defines a square, rectangle, oval, or other configuration of enclosed passage.

As to the exemplary embodiment shown in Figures, an annular member (28) coupled to the conduit interface second side (27) surrounds a substantially circular interface opening (25). The substantially cylindrical conduit external surface (2a) can be coupled to the annular member (28) by a conduit first end (30) (as shown the examples of FIGS. 1, 2, 5 and 7). As to particular embodiments, the fluid flow conditioning conduit (2) can have a conduit internal surface (2b) defining a conduit fluid flow path (29) between the conduit first end (30) and the conduit second end (31) (as shown in the example of FIG. 7).

As to particular embodiments, the conduit internal surface (2b) can define a substantially cylindrical conduit internal surface (2b). The fluid flow conditioning conduit (2) can have a length disposed between the conduit first end (30) and a conduit second end (31). As to the illustrative embodiments shown in the Figures, a length of between about four times and about six times the diameter of the fluid flow conditioning conduit (2) can provide a suitable flow path (29) for a fluid flow (33) in accordance with the invention (as shown in the example of FIG. 7); however, embodiments can have a greater or lesser length depending upon the application.

Figure 7:
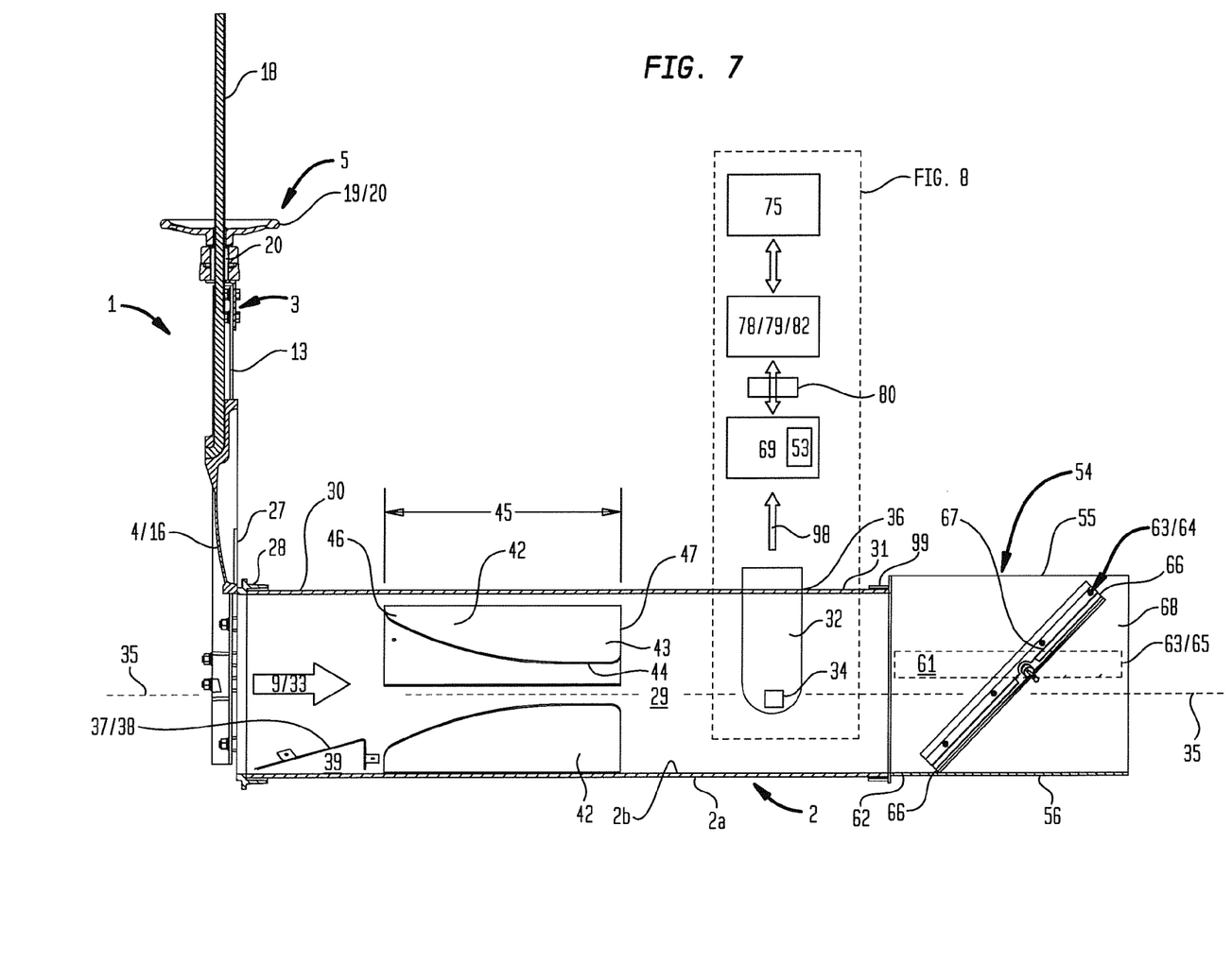
FIG. 7 is a cross sectional view 7-7 of the particular embodiment of a fluid flow delivery conduit coupled to a fluid flow control gate in the open condition as shown in FIG. 6.

Now referring primarily to FIG. 7, embodiments of the fluid flow conditioning conduit (2) can further include a fluid flow meter (32) disposed in relation to said fluid flow conditioning conduit (2) for sensing the velocity of fluid flow (33) in said conduit fluid flow path (29) of the fluid flow conditioning conduit (2). As to particular embodiments, the fluid flow meter (32) can be sealably mounted to a conduit external surface (2a) of the fluid flow conditioning conduit (2). The fluid flow conditioning conduit (2) can have an aperture element (36) which passes between the conduit external surface (2a) and the conduit internal surface (2b) of the fluid flow conditioning conduit (2) which allows the fluid flow meter (32) to sense the velocity of the fluid flow (33) in the conduit fluid flow path (29) of the fluid flow conditioning conduit (2). As to particular embodiments, the fluid flow meter (32) can be located proximate the conduit second end (31) to dispose a fluid flow sensor (34) proximate the central longitudinal axis (35) of the fluid flow conditioning conduit (2). As to other embodiments, the fluid flow meter (32) (such as ultrasonic flow meters) can be mounted to the internal surface (2b) of the fluid flow conditioning conduit (2) proximate the conduit second end (31) to ultrasonically sense the fluid flow (33). Understandably, the fluid flow meter (32) can be mounted in accordance with the manufacturer's instructions for sensing fluid flow (33) within the flow path (29) of the fluid flow conditioning conduit (2) at a location which may vary depending upon the application.

Figure 8:
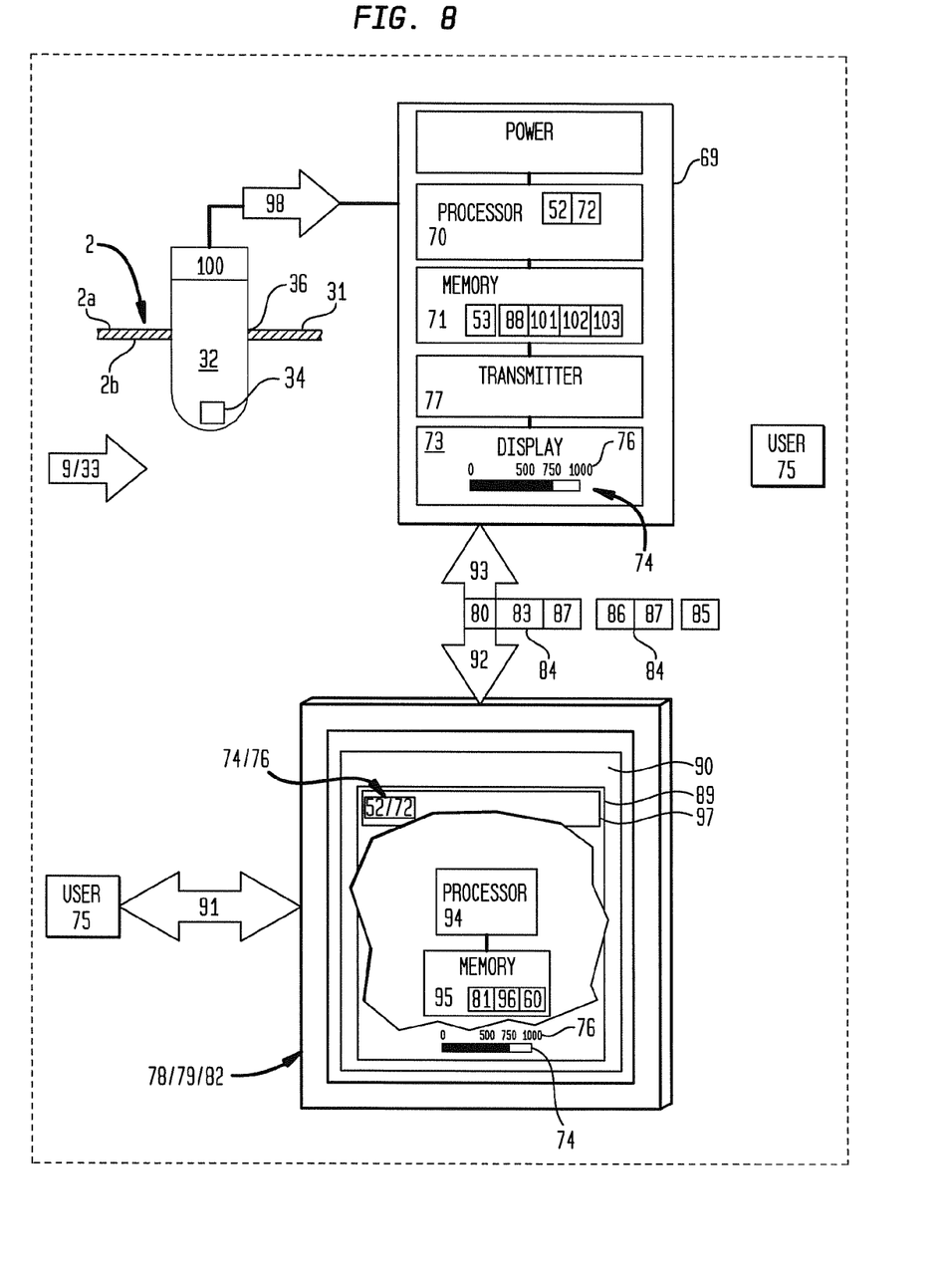
FIG. 8 is a partial front elevation of an embodiment of gate position monitor including a gear driven by vertical movement of the stem of the gate about the axis of a shaft of a potentiometer.

Now referring primarily to FIGS. 7 and 8, as to certain embodiments the fluid flow sensor (34) can produce a signal (98) which varies in relation to the velocity of the fluid flow (33) inside of the fluid flow conditioning conduit (2). The signal (98) can be correspondingly converted to a fluid flow velocity value (52) by a computer implemented fluid volume measurement program (53) which can be used in association with known dimensional relations of the fluid flow conditioning conduit (2) to generate a measurement of the volume of the fluid flow (33) passing through the fluid flow conditioning conduit (2). Any of a numerous and wide variety of fluid flow meters (32) can be used with embodiments of the invention, such as ultrasonic, Doppler, propeller, or the like, depending on the application. As one example, a propeller flow meter similar to the McPropeller flow meter available from McCrometer, Inc., 3255 West Stetson Avenue, Hemet, Calif. 92445 may be utilized.

Now referring primarily to FIG. 8, as to certain embodiments a computer device (69) including a processor (70) coupled to a memory element (71) can contain the fluid volume measurement program (53). The fluid volume measurement program (53) can include a signal analyzer (101) which can be executed to analyze the signal (98) and further include a fluid flow velocity calculator (102) executable to calculate said velocity of said fluid flow (33) and to generate the corresponding fluid flow velocity value (52). The fluid volume measurement program (53) can further include a fluid flow volume calculator (103) executable to convert the fluid flow velocity value (52) into a fluid flow volume value (72) based upon the known dimensional relations of the fluid flow conditioning conduit (2) and elapsed time. The fluid flow volume value (72) can be expressed as volumetric flow rate (units of volume over time) such cubic feet per second or can by execution of the fluid volume measurement program (53) convert the volumetric flow rate for a given period of time into volume such as liters, gallons, cubic feet or the like.

As to particular embodiments, the fluid volume measurement program (53) can be further executed to display the fluid flow velocity value (52) or the fluid flow volume value (72) on a display surface (73) as viewable indicia (74) which can be viewed directly by a user (75). The viewable indicia (74) can take any of numerous forms such as numerical indicia (76) which as an illustrative example can represent a calibrated scale from 0 cubic feet per second through 1000 cubic feet per second being the end points of the volumetric flow rate for the particular embodiment of the fluid flow conditioning conduit or can be numerical indicia (76) representing the actual volume of fluid passed through the fluid flow conditioning conduit (2) over a given period of time (as shown in the example of FIG. 8). As to particular embodiments, the computer (69) which implements the fluid volume measurement program (53) and the fluid flow meter (32) can be in the form of a unitary assembly or the computer can be discrete from the fluid flow meter (32). As to particular embodiments, the fluid flow meter (32) can be hardwired to the computer (69) and as to other embodiments the fluid flow meter (32) can further include wireless sender (100) capable of transmitting the signal (98) to the transceiver (77) (or wireless receiver) of the computer (69).

As to particular embodiments, the fluid flow conditioning conduit (2) can further include a transmitter or transceiver (77) capable of transmitting (whether wired or wirelessly) the fluid flow volume value (72) to one or more discrete electronic devices (78). As illustrative examples, the electronic device (78) can be individually or collectively one or more of: slate or pad computers, personal digital assistants, cellular telephone phone, personal computer, minicomputers, set-top box or intelligent televisions connected to receive data through an entertainment medium such as a cable network or a digital satellite broadcast, or the like.

As an illustrative example, the electronic device (78) can take the form of a limited-capability computer (79) designed specifically for navigation on the World Wide Web of the Internet (80) and can include an Internet browser (81) such as Microsoft's INTERNET EXPLORER, GOGGLE CHROME, MOZILLA, FIREFOX, or the like, which functions to download and render multimedia content that is formatted in "hypertext markup language" (HTML).

As a second illustrative example, the electronic device (78) can take the form of a cellular telephone (82) operable in a radio network (83) (cellular network or mobile network) distributed over geographic areas (84) (also known as a "cell"), and served by at least one fixed-location transceiver (85) (also known as a "cell site" or "base station"). Each geographic area (84) using a different set of frequencies from neighboring cells (86), to avoid interference and to provide a bandwidth (87) within each cell (86).

In these exemplary environments (or other environments), as to particular embodiments, the processor (70) can be programmed to implement the most significant portions of the fluid volume measurement program (53) (or other computer code) including a user interface module (88) executable to display a graphical user interface (89) on an electronic device display surface (90) of the electronic device (78) (79) (82) which by user interaction (91) activates the fluid volume measurement program (53) to display the viewable indicia (74) representing a fluid flow velocity value (52) or the a fluid flow volume value (72) (or both) on the electronic device display surface (90). As to these embodiments, the program code including the graphical user interface module (88) and fluid volume measurement program (53) (and other executable program modules) can be resident in the memory element (71) (as shown in FIG. 8) and the one or more electronic devices (78) (79) (82) can use the browser (81) to simply display downloaded images and data (collectively "content") (92) and to relay user inputs (93) back to the processor (70). The processor (70) can respond by formatting new pages of the graphical user interface (89) and downloading them for display on the electronic devices (78) (79) (82).

As to other embodiments, the processor (70) executing the fluid volume measurement program (53) (or other computer code) can be used primarily as a source of content (92), with primary responsibility for implementing the user interface module (88) and fluid volume measurement program (53) (and other program modules) being placed upon each of the one or more electronic devices (78) (79) (81) (see for example FIG. 8). As to these embodiments, each of the one or more electronic devices (78) can include an electronic device processor (94) coupled to an electronic device memory element (95) containing computer code (96). The electronic device processor (94) can be capable of running a computer code (96) to display the graphical user interface (89) on the display surface (90) and to retrieve, transform and display content (92) transmitted from the processor (70) in the corresponding graphical user interface fields (97) provided in the graphic user interface (89).

Now referring primarily to FIGS. 6 and 7, particular embodiments of the fluid flow conditioning conduit (2) can further include a ramp element (37) coupled to the bottom internal surface of the fluid flow conditioning conduit (2) proximate the conduit first end (30). The ramp element (37) provides an angled ramp surface (38) which angles toward the central longitudinal axis (35) (as shown in the example of FIG. 7) of the fluid flow conditioning conduit (2) commencing proximate the conduit first end (30) and can terminate at distance from the conduit first end (30) of about 10 percent and about 30 percent of the length of the fluid flow conditioning conduit (2). The ramp angle (39) can be sufficient to redirect the fluid flow (33) toward the center of the fluid flow conditioning conduit (2). The ramp element (37) can further include a flow aperture (40) which defines a flow passage (41) through the angled ramp surface (38). The flow aperture (40) can have a central location in the angled ramp surface (38) having boundary open to the bottom internal surface of the flow conditioning conduit (2). The flow passage (41) provides a particulate and debris clearing pathway through the ramp element (37). As to the particular embodiment shown in FIG. 7, the ramp angle (39) can be within the range of about 15 degrees and about 25 degrees in relation to the bottom surface and extends about 20 percent of the length of the fluid flow conditioning conduit (2) with a height of about 20 percent of the diameter of the fluid flow conditioning conduit (2). The ramp element (37) above described provides an example of a fluid flow conditioning element which functions to direct fluid flow (33) toward the center of the fluid flow conditioning conduit (2); however, fluid flow (33) can be directed to the center of the fluid flow conditioning conduit (2) utilizing structures of different configuration.

Again referring primarily to FIGS. 6 and 7, embodiments of the fluid flow delivery conduit (2) can further include one or more vanes (42) coupled in fixed relation to the internal surface of the fluid flow conditioning conduit (2) and extending radially inward a distance toward the central longitudinal axis (35). Each vane (42) can be produced from a rigid thin flat sheet material having a pair of flat surfaces (43) (44) disposed a distance apart. Each vane (42) can have a vane length (45) disposed between opposed vane ends (46) (47) aligned without offset with respect to the conduit first end (30) and the conduit second end (31). Each vane (42) acts on the fluid flow (33) within the fluid conditioning conduit (2) to increase laminar flow or reduce turbulence or swirl generated by the ramp element (37), redirection of the fluid flow (33) from the fluid supply source such as a reservoir, channel, or the like. As to particular embodiments, the one or more vanes (42) can, commencing at the vane end (46) proximate the first conduit end (30), curve, taper, or the like, radially toward the longitudinal axis (35) approaching the vane end (46) distal from the first conduit end (30). These configurations can prevent or reduce attachment of debris to the vanes (42). Typically, the one more vanes (42) will extend radially inward between about 20 percent and about 70 percent of the distance toward the central longitudinal axis (35) of the fluid flow conditioning tube (2). As to particular embodiments, the vanes (42) can be provided in pairs disposed in radial opposed relation a distance apart (as shown in the example of FIG. 6). In particular embodiments, the pairs of vanes (42) can extend unequal distances toward the central longitudinal axis (35). As an illustrative example, the first of the pair of radially opposed vanes (42) can extend 20 percent of the distance toward the central longitudinal axis (35) while the second of the pair of radially opposed vanes (42) can extend 70 percent of the distance toward the central longitudinal axis (35).

Figure 9A:
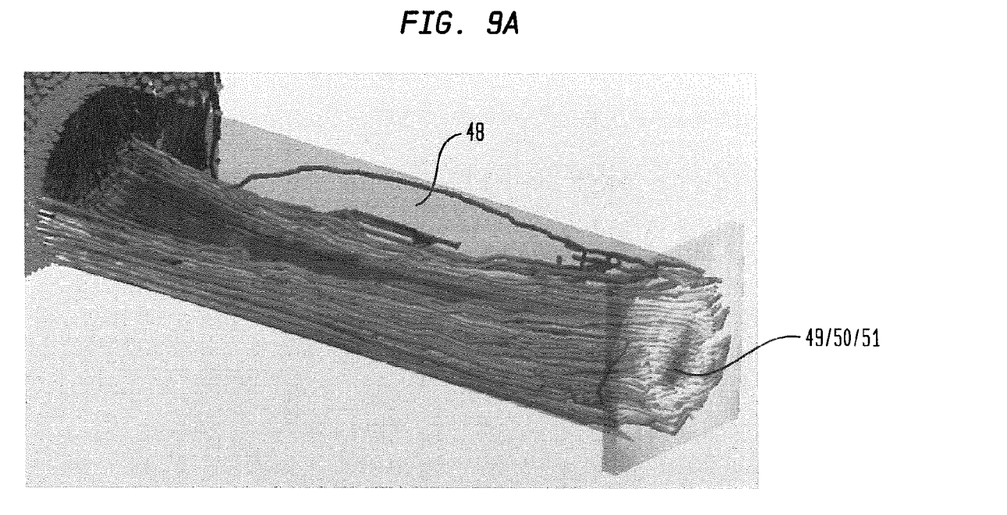
FIG. 9A is a computational fluid dynamics analysis of a fluid flow generated within an embodiment of a fluid flow conditioning conduit without additional fluid flow conditioning elements.
Figure 9B:
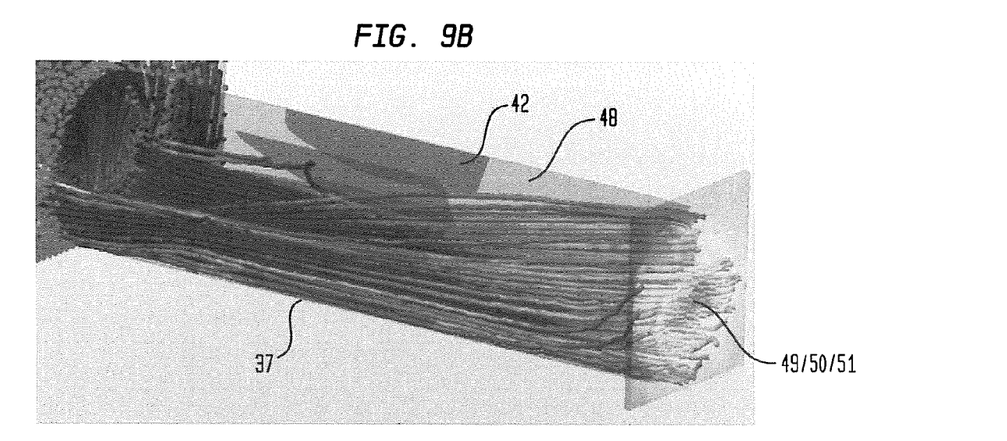
FIG. 9B is a computational fluid dynamics analysis of fluid flow within an embodiment of a fluid flow conditioning conduit with fluid flow conditioning vanes and ramp.
Figure 10A:
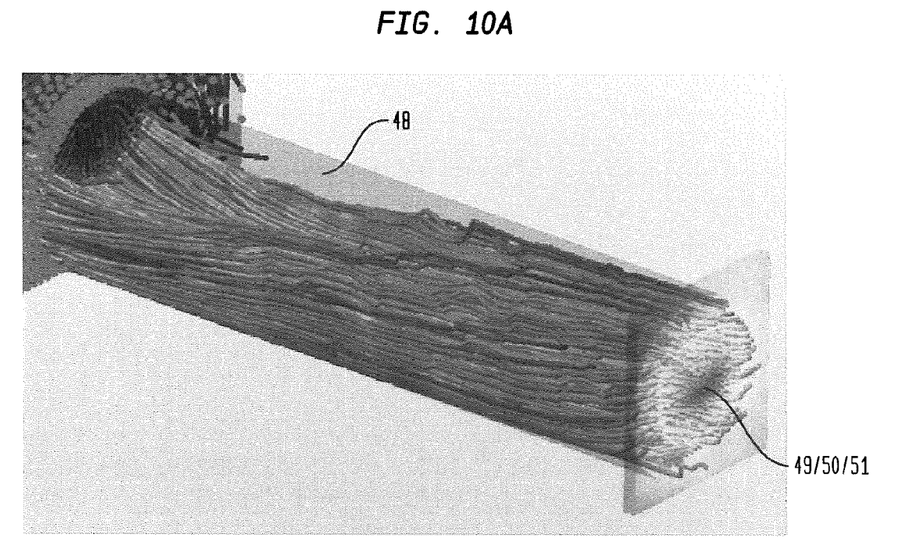
FIG. 10A is a computational fluid dynamics analysis of a fluid flow generated within an embodiment of a fluid flow conditioning conduit without additional fluid flow conditioning elements.

Now referring to FIGS. 9A, 9B, 10A, 10 B, 11A, and 11B, each of which show a flow field (48) within embodiments of the fluid flow conditioning conduit (2) analyzed using computational fluid dynamics ("CFD"). Computers were used to perform calculations required to simulate the interaction of fluid flow (33) within the fluid flow conditioning conduit (2) without inclusion of the vanes (42) and ramp element (37) (as shown in the examples of FIGS. 9A, 10A, and 11A) and with the inclusion of the vanes (42) and ramp element (37) (as shown in the examples of FIGS. 9B, 10B, 11B). As an example, CONVERGE™ CFD software offered by Convergent Science, Inc. can be used in analysis of the flow fields (48) within the inventive fluid flow conditioning conduit (2). CFD displays fluid flow lines (49) within the flow field (48) representing fluid flow direction (50) (the directional change in fluid flow lines representing directional change in fluid flow) and fluid flow velocity (51) (the fluid flow velocity represented by color change over the spectrum from blue toward red with increasing fluid flow velocity when viewed in color and change in grey tone generally from light to dark with increasing fluid flow velocity when viewed in black and white).

Now referring to the examples of FIGS. 9A and 9B which represent particular embodiments of the inventive fluid flow monitoring system as shown in the examples of FIGS. 1-7 in which the conduit interface (24) has circular interface opening (25). The gate (4) can be raised to allow fluid flow (33) through about the lower 25 percent of the area defined by the entire circular interface opening (25). In the particular embodiment of the invention shown by FIG. 9A, the fluid flow conditioning conduit (2) does not include the vane elements (42) or the ramp element (37) and FIG. 9B does include the vane elements (42) and the ramp element (37).

By comparison, the fluid flow (33) as shown in FIG. 9B has generally less turbulence as compared with FIG. 9A as represented by the generally straighter colored fluid flow lines (49). Additionally, the fluid flow velocity (51) of the fluid flow (33) approaching the conduit second end (31) is substantially more homogeneous over the cross section and having generally lesser fluid flow velocity (51) proximate the central longitudinal axis (35) as compared with the embodiment of FIG. 9A.

Now referring to the examples of FIGS. 10A and 10B which again represent embodiments of the inventive fluid flow monitoring system as shown in the examples of FIGS. 1-7 in which the conduit interface (24) has circular interface opening (25). The gate (4) is raised to allow fluid flow (33) through about the lower 50 percent of the area defined by the entire circular interface opening (24). The particular embodiment of the invention shown by FIG. 10A does not include the vane elements (42) or the ramp element (37) and FIG. 10B does include the vane elements (42) and the ramp element (37).

Figure 10B:
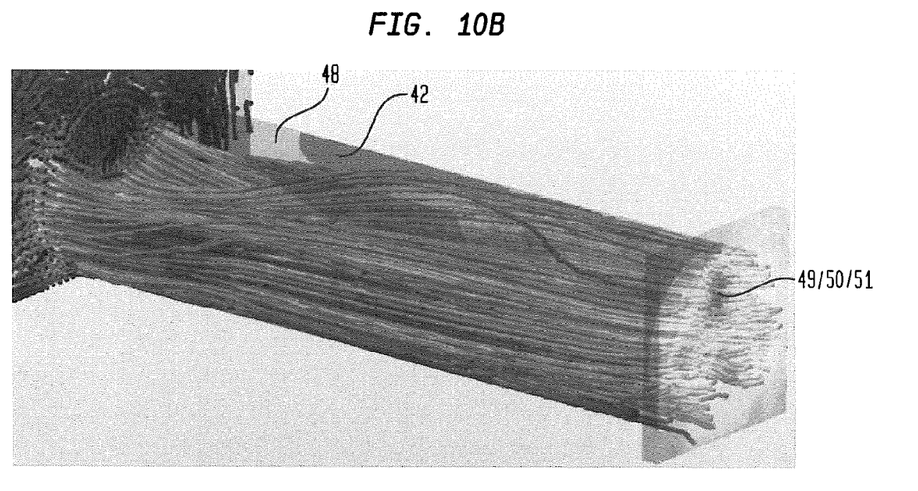
FIG. 10B is a computational fluid dynamics analysis of fluid flow within an embodiment of a fluid flow conditioning conduit with fluid flow conditioning vanes and ramp.
Figure 11A:
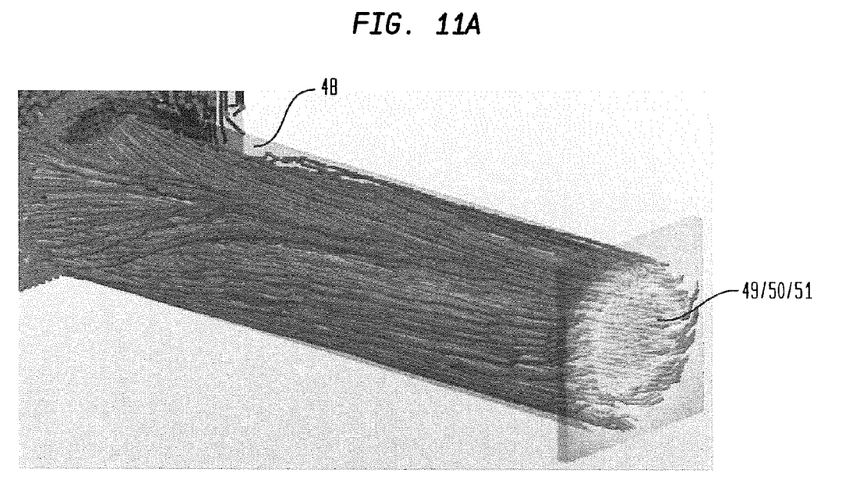
FIG. 11A is a computational fluid dynamics analysis of a fluid flow generated within an embodiment of a fluid flow conditioning conduit without additional fluid flow conditioning elements.
Figure 11B:
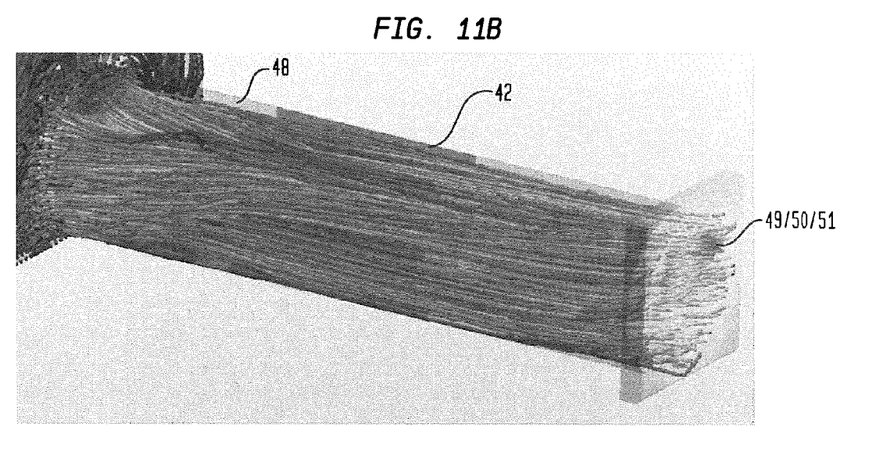
FIG. 11B is a computational fluid dynamics analysis of fluid flow within an embodiment of a fluid flow conditioning conduit with fluid flow conditioning vanes and ramp.

By comparison, the fluid flow (33) as shown in FIG. 10B is generally less turbulent as compared with FIG. 10A as represented by the generally straighter colored fluid flow lines (49). Additionally, the fluid flow velocity (51) at the conduit second end (31) is substantially more homogeneous over the cross section and having generally lesser fluid flow velocity (51) proximate the central longitudinal axis (35) as compared with the example of FIG. 10A.

Now referring to the examples of FIGS. 11A and 11B which again represent embodiments of the inventive fluid flow monitoring system as shown in the examples of FIGS. 1-7 in which the conduit interface (24) has circular interface opening (25). The gate (4) is raised to allow fluid flow (33) through about the lower 75 percent of the area defined by the entire circular interface opening (25). The particular embodiment of the invention shown by FIG. 11A does not include the vane elements (42) or the ramp element (37) and FIG. 11B does include the vane elements (42) and the ramp element (37).

By comparison, the fluid flow (33) as shown in FIG. 11B is generally less turbulent as compared with FIG. 11A as represented by the generally straighter colored fluid flow lines (49). Additionally, the fluid flow velocity (50) at the conduit second end (31) is substantially more homogeneous over the cross section and having generally lesser fluid flow velocity (51) proximate the central longitudinal axis (35).

In general, the comparisons show that as to embodiments which include either or both of the vanes (42) and the ramp element (37) (as shown in the example of FIGS. 9B, 10B and 11B), the fluid flow (33) within the fluid flow conditioning conduit (2) can have substantially less turbulence and the fluid flow velocity (51) proximate the conduit second end (31) can have greater homogeneity over the cross section.

The embodiments shown in the examples of FIGS. 9B, 10B and 11B can provide an advantage because a flow meter (32) fluidicly engaged with a fluid flow (33) (as shown in the example of FIG. 7) having less turbulence and having greater homogenous fluid flow velocity (51) within the fluid flow conditioning conduit (2) can generate a signal (36) which converted to fluid flow velocity values (52) allows greater accuracy in measuring the volume of fluid delivered through the interface opening (25).

Again referring primarily to FIGS. 1-7, embodiments of the invention can further include a conduit fill-flush element (54) which operates to fill and maintain the fluid flow conditioning conduit (2) full of fluid (9) even when the fluid flow (33) through the conduit interface opening (25) would not normally have sufficient height to fill and maintain the fluid flow conditioning conduit (2) full of fluid (9). While embodiments of the conduit fill-flush element (54) can be configured in a numerous and wide variety of configurations which function similarly, a particular embodiment of a conduit fill-flush element (54) can be configured as an open ended channel element (55) or similar open ended enclosure. As to particular embodiments, the channel element (55) can have a channel bottom (56) of substantially square or rectangular flat, trapezoidal, or other configuration having two pairs of opposed edges (57) (58). A pair of channel side walls (59) (60) of substantially square or rectangular flat configuration can be joined to one pair of the opposed edges (57) (58) of the channel bottom (56) in substantially parallel opposed upright relation to provide a channel flow path (61) through which the fluid (9) from the fluid flow conditioning conduit (2) can flow. However, this illustrative example is not intended to limit the invention to a square or rectangular channel element and other cross sectional configurations of the channel element can be utilized such as circular, elliptical, or the like. A channel interface element (99) can be utilized to connect the conduit second end (2) to a first open channel end (62) to direct the fluid flow (33) from the fluid flow conditioning conduit (2) through the channel element (55).

Now referring primarily to FIG. 7, the channel element (55) can further provide a channel gate (63) rotatably coupled inside of the channel element (55). The channel gate (63) rotates between a fill condition (64) and a flush condition (65). In the fill condition (64) the channel gate (63) rotates to engage the leading edge (66) of the channel gate (63) with the channel bottom (56) to generate an inclined surface (67) which terminates at the trailing edge (68) of the channel gate (63). The channel gate (63) can be configured to dispose the trailing edge (68) at a height above the leading edge (66) to act as a weir requiring the fluid flow (33) to fill and maintain full the fluid flow conditioning conduit (2) before flowing over the trailing edge (68) to egress from the channel element (55). In the flush condition (64), the channel gate (63) rotates to disengage the leading edge (66) from the channel bottom (56) allowing fluid flow (33) substantially unimpeded by the channel gate (63). The unimpeded fluid flow (33) can flush accumulated particulate, sediment and other debris out of the fluid flow conditioning conduit and conduit fill-flush element (54).

As to certain embodiments of the invention, the fluid flow control gate (1) can be a conventional fluid flow control gate (1) retrofitted to couple to embodiments of the fluid flow conditioning conduit (2). Conventional fluid flow control gates (1) (also generally referred to as slide gates) include a frame assembly (3), a gate (4), and a gate operator (5) which can be provided in a numerous and wide varieties of configurations.

As can be understood the present invention may be embodied in a variety of ways. The invention involves numerous and varied embodiments of a fluid flow conditioning conduit which can be incorporated or retrofitted into a wide variety of fluid flow control gates, or similar applications.

As such, the particular embodiments or elements of the invention disclosed by the description or shown in the figures or tables accompanying this application are not intended to be limiting, but rather exemplary of the numerous and varied embodiments generically encompassed by the invention, including the best mode, or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "fluid flow sensor" should be understood to encompass disclosure of the act of "sensing fluid flow"—whether explicitly discussed or not—and, conversely, were there effectively disclosure of the act of "sensing fluid flow", such a disclosure should be understood to encompass disclosure of a "fluid flow sensor" and even a "means for fluid flow sensing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a seal" refers to one or more of those seals. As such, the terms "a" or "an", "one or more" and "at least one" can be used interchangeably herein.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus, the applicant(s) should be understood to claim at least: i) each of the fluid flow conditioning conduits herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention(s) that may be claimed. The applicant does not waive any right to develop further claims based upon the description set forth above as a part of any continuation, division, or continuation-in-part, or similar application.

The invention claimed is:

1. A fluid flow measurement system, comprising:
   a fluid flow conditioning conduit configured to couple to a fluid flow control gate, said fluid flow conditioning conduit having a length disposed between a conduit first end and a conduit second end, said fluid flow conditioning conduit having a conduit internal surface defining a conduit fluid flow path between said conduit first end and said conduit second end;
   a ramp element coupled to said conduit internal surface, said ramp element having an angled ramp surface commencing proximate a bottom of said fluid flow conditioning conduit proximate said conduit first end and which angles toward a central longitudinal axis of said fluid flow conditioning conduit; and
   a fluid flow meter disposed in relation to said fluid flow conditioning conduit, said fluid flow meter capable of sensing a velocity of said fluid flow in said fluid flow path of said fluid flow conditioning conduit.

2. The system of claim 1, wherein fluid flow conditioning conduit has a substantially cylindrical conduit internal surface.

3. The system of claim 2, wherein said conduit internal surface has a diameter, and wherein said fluid flow conditioning conduit has a length of between about four and about six times said diameter.

4. The system of claim 1, wherein said ramp element has a length of between about 10 percent and about 30 percent of the length of said fluid flow conditioning conduit.

5. The system of claim 4, wherein said angled ramp surface has an angle sufficient to redirect said fluid flow toward said central longitudinal axis of said fluid flow conditioning conduit.

6. The system of claim 5, wherein said angle of said angled ramp is between about fifteen degrees and about 25 degrees in relation to said bottom of said fluid flow conditioning conduit.

7. The system of claim 6, wherein said angled ramp further includes a flow aperture open to said bottom of said fluid flow conditioning conduit.

8. The system of claim 7, further comprising one or more vanes coupled to said conduit internal surface of said fluid flow conditioning conduit each said one or more vanes extend radially inward a distance toward said central longitudinal axis of said fluid flow conditioning conduit.

9. The system of claim 8, wherein each of said one or more vanes has a vane length disposed between opposed vane ends aligned without offset with the conduit first end and the conduit second end.

10. The system of claim 9, wherein each of said one or more vanes taper radially inward toward said central longitudinal axis of said fluid flow conditioning conduit approaching said second conduit second end.

11. The system of claim 10, wherein said one more vanes extend radially inward between about 20 percent and about 70 percent of the distance toward the central longitudinal axis of said fluid flow conditioning conduit.

12. The system of claim 11, wherein said one or more vanes comprise a pair of vanes disposed in radial opposed relation a distance apart, and wherein a first one of said pair of vanes extends a greater distance toward said central longitudinal axis of said fluid flow conditioning conduit than said second one of said pair of vanes which extends a lesser distance toward said central longitudinal axis of said fluid flow conditioning conduit.

13. The system of claim 12, wherein said fluid flow meter measures said velocity of said fluid flow in said conduit fluid flow path proximate said conduit second end.

14. The system of claim 13, wherein said C of said fluid flow conditioning conduit, said fluid flow conditioning conduit having an aperture element which passes between said conduit external surface and said conduit internal surface of said fluid flow conditioning conduit which allows said fluid flow meter to sense said velocity of said fluid flow in said fluid flow path of said fluid flow conditioning conduit.

15. The system of claim 14, wherein said fluid flow meter is mounted to said conduit internal surface of the fluid flow conditioning conduit which allows said fluid flow meter to sense said velocity of said fluid flow in said fluid flow path of said fluid flow conditioning conduit.

16. The system of claim 15, further comprising a conduit fill-flush element coupled to said conduit second end, said conduit fill-flush element operable to maintain a level of said fluid flow in said fluid flow path of said fluid flow conduit.

17. The system of claim 16, wherein said conduit fill-flush element comprises:
 a channel element having a length disposed between a channel first end and a channel second end, said channel element having a channel internal surface which defines a channel flow path between said channel first end and said channel second end; and
 a channel gate disposed in said channel element, said channel gate having leading edge adapted to engage said channel internal surface to generate an inclined surface terminating in a trailing edge, said trailing edge disposed at a height in said channel element which maintains said level of said fluid flow in said fluid path.

18. The system of claim 17, wherein said channel gate rotates in relation to said channel internal surface between a fill condition which engages said leading edge with said channel internal surface to generate said inclined surface terminating in said trailing edge at said height in said channel element and a flush condition which disengages the leading edge from the channel internal surface allows said fluid flow to pass substantially unimpeded through said channel flow path.

19. The system of claim 18, wherein said channel element has a pair of channel side walls of substantially flat rectangular configuration each joined in upright relation to the opposed edges of a channel bottom having a substantially flat rectangular configuration, and wherein said channel gate has a substantially square configuration which in the fill condition engages said leading edge with said channel bottom to generate said inclined surface terminating in said trailing edge at said height in said channel element which maintains said level of said fluid flow in said fluid path.

20. The system of claim 19, wherein said level of said fluid flow substantially fills the volume of said conduit flow path.

21. The system of claim 20, further comprising a fluid flow control gate coupled to said conduit first end, said fluid control gate having a gate positionable between an open position and a closed position.

22. The system of claim 1, wherein said fluid flow meter generates a signal which varies in relation to said velocity of the fluid flow inside of said fluid flow conditioning conduit, and further comprising a computer capable of executing a fluid volume measurement program to correspondingly convert said signal into a fluid flow velocity value, said fluid volume measurement program fluid further executable to convert said flow velocity value into a measure of volume of said fluid flow based on dimensional relations of said fluid flow conditioning conduit.

\* \* \* \* \*